(12) United States Patent
Deutesfeld et al.

(10) Patent No.: US 7,350,213 B2
(45) Date of Patent: Mar. 25, 2008

(54) SYSTEM AND METHOD FOR DYNAMIC SELECTION OF STATELESS/STATEFUL SOFTWARE COMPONENTS

(75) Inventors: Andreas Deutesfeld, Altlussheim (DE); Carine Tchoutouo Djomo, Heidelberg (DE); Gerhard Weigelt, Walldorf (DE)

(73) Assignee: SAP AG, Walldorf (DE)

( * ) Notice: Subject to any disclaimer, the term of this patent is extended or adjusted under 35 U.S.C. 154(b) by 678 days.

(21) Appl. No.: 10/464,497

(22) Filed: Jun. 19, 2003

(65) Prior Publication Data
US 2004/0261022 A1  Dec. 23, 2004

(51) Int. Cl.
G06F 9/54 (2006.01)
G06F 7/02 (2006.01)

(52) U.S. Cl. .................. 719/316; 709/224; 717/116
(58) Field of Classification Search ............ None
See application file for complete search history.

(56) References Cited

U.S. PATENT DOCUMENTS

| | | | |
|---|---|---|---|
| 2003/0005181 A1* | 1/2003 | Bau et al. | 709/330 |
| 2003/0088664 A1* | 5/2003 | Hannel et al. | 709/224 |
| 2003/0115376 A1* | 6/2003 | Drobychev et al. | 709/328 |
| 2004/0172618 A1* | 9/2004 | Marvin | 717/116 |
| 2007/0016595 A1* | 1/2007 | Mullins | 707/100 |

* cited by examiner

*Primary Examiner*—William Thomson
*Assistant Examiner*—Abdou K Seye
(74) *Attorney, Agent, or Firm*—Kenyon & Kenyon LLP (57) ABSTRACT

A method and system for dynamic selection of stateless/stateful component software. According to one embodiment, an application determines at runtime a characteristic associated with the process to be implemented by a software component, wherein stateless and stateful versions of the software component are available to implement the process, and invokes either the stateless or stateful version of the software component to implement the process based on the characteristic.

16 Claims, 11 Drawing Sheets

SYSTEM AND METHOD FOR DYNAMIC SELECTION OF STATELESS/STATEFUL SOFTWARE COMPONENTS

BACKGROUND OF THE INVENTION

To remain competitive in today's economic and technological environment, software-oriented companies are placing an increasing focus on creating software solutions that appeal to users, developers and the industry in general. One particular technology that has such appeal is "component software," which can be integrated within new and existing application frameworks.

Component software technology appeals to users because it is generally platform independent, meaning that users can run the underlying software through a container (such as a Web browser) on computers having different hardware architectures and/or operating systems. Component software appeals to developers because they need only write code in the programming language of the component software, and not worry about having to learn the various programming languages used by individual companies. Component software appeals to the industry in general because it fosters interoperability among disparate systems and services.

A software "component" of component software technology is a reusable callable piece of software that is not native to a calling application. (The non-native aspect of the software component signifies that the component is executed in a different software runtime environment than that of the calling application, irrespective of whether the software component and calling application reside on the same or remote servers.) Examples of existing component software technology include COM objects, .NET applications, CORBA objects and JavaBeans. A component can exist in both a "stateless" or "stateful" form. In a stateless form, the component is created (or instantiated) when called by an application, performs its task and then terminates, releasing all state information (e.g., any information held during the performance of the task). In a stateful form, the component remains instantiated after performing a task until the application specifically terminates it; thus, information is retained between separate component calls.

There are both advantages and disadvantages associated with stateless and stateful software components. Stateless components have less system resource overhead since they are not in existence for long and do not store state information; however, communication traffic between the calling application and the stateless component may be increased because the calling application has to instantiate the component every time it needs a task performed, and each instantiation call may carry bandwidth-consuming information necessary for the task to be performed. On the other hand, stateful components have more system resource overhead since they retain state information, but the accompanying communication traffic may be reduced since the calling application does not have to keep re-sending duplicate information (e.g., parameter data) to the component every time it is called to perform a task.

Currently, component developers analyze the nature of the task to be performed by the software component in order to decide whether to utilize a stateless or stateful software component to implement the task. For example, a stateless component may be better suited to implement a task that does not get called often and that does not require much information to be passed to it from the calling application. A stateful component may be better suited to implement a task that gets called quite often but processes the same information which can be held internally. Once a decision is made as to the type (stateless/stateful) of component to utilize, the developer codes the component and either integrates it into an application framework or makes sure that the application framework can access the component at runtime.

There are shortcomings associated with this development process and runtime solution, however. In some cases the nature of the task to be performed by the software component is not fully known until runtime, at which time the decision has already been made as to the type of component that will implement the task. The use of the wrong type of component can lead to a significant hit in runtime performance.

Accordingly, there is a need in the art for a system and method that dynamically selects at runtime the type of component to invoke in order to implement a particular task.

SUMMARY OF THE INVENTION

Embodiments of the present invention provide for the dynamic selection of stateless/stateful component software. According to one embodiment, an application determines at runtime a characteristic associated with the process to be implemented by a software component, wherein stateless and stateful versions of the software component are available to implement the process, and invokes either the stateless or stateful version of the software component to implement the process based on the characteristic.

DETAILED DESCRIPTION

Overview

Figure 1:
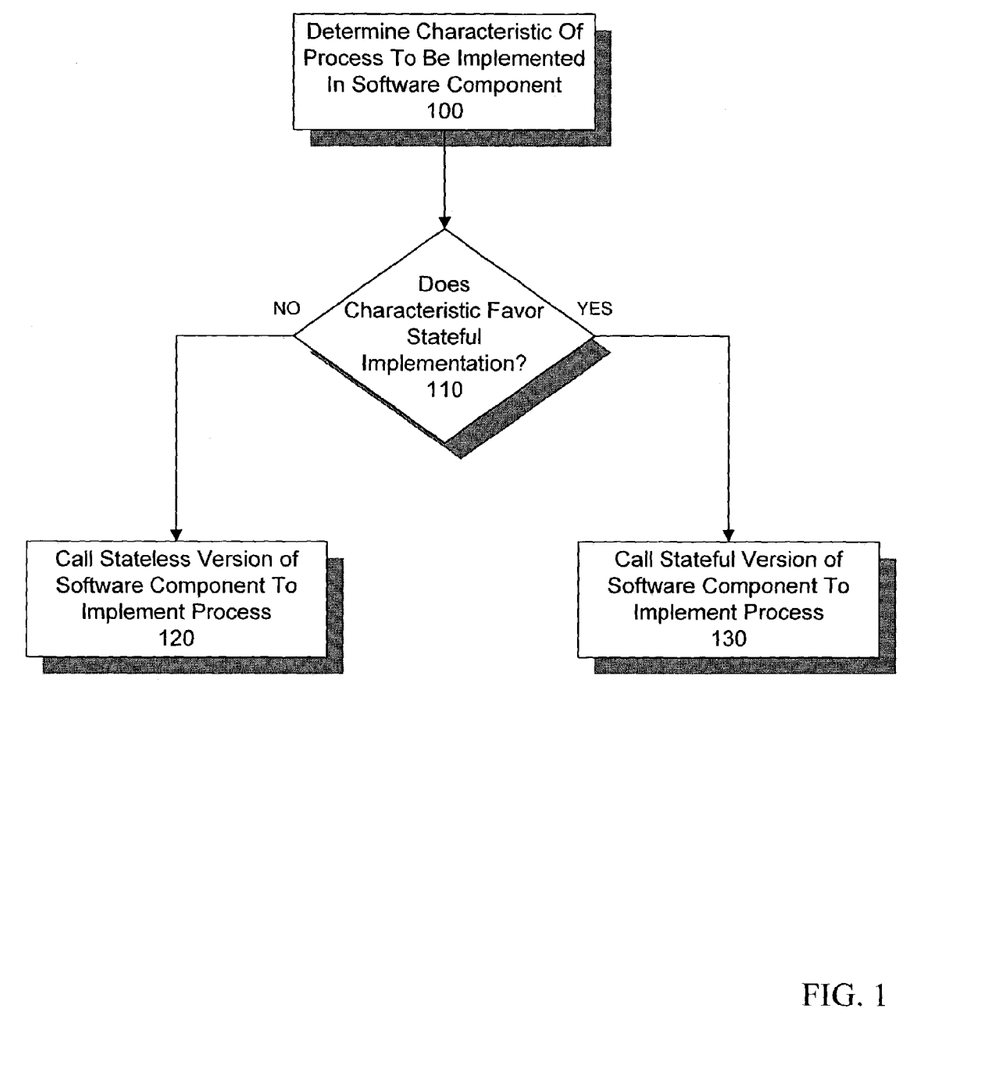
FIG. 1 is a flow chart that depicts a process for dynamically selecting stateful or stateless software components in accordance with an embodiment of the present invention.

FIG. 1 depicts a process for dynamically selecting stateful or stateless software components in accordance with an embodiment of the present invention. At runtime, when a software application is ready to invoke a software component to implement a particular process, it first makes a determination about a characteristic of the process to be implemented (step 100). This characteristic enables the application to choose (step 110) whether it should call a stateless version of the component (step 120) or a stateful version of the component (step 130).

The present invention is especially useful in a situation in which the characteristic of the process to be implemented by the component is not known prior to runtime, but which characteristic ultimately affects the performance of one type (stateful/stateless) of component over another. Such performance factors could include network traffic and resource load.

Figure 2:
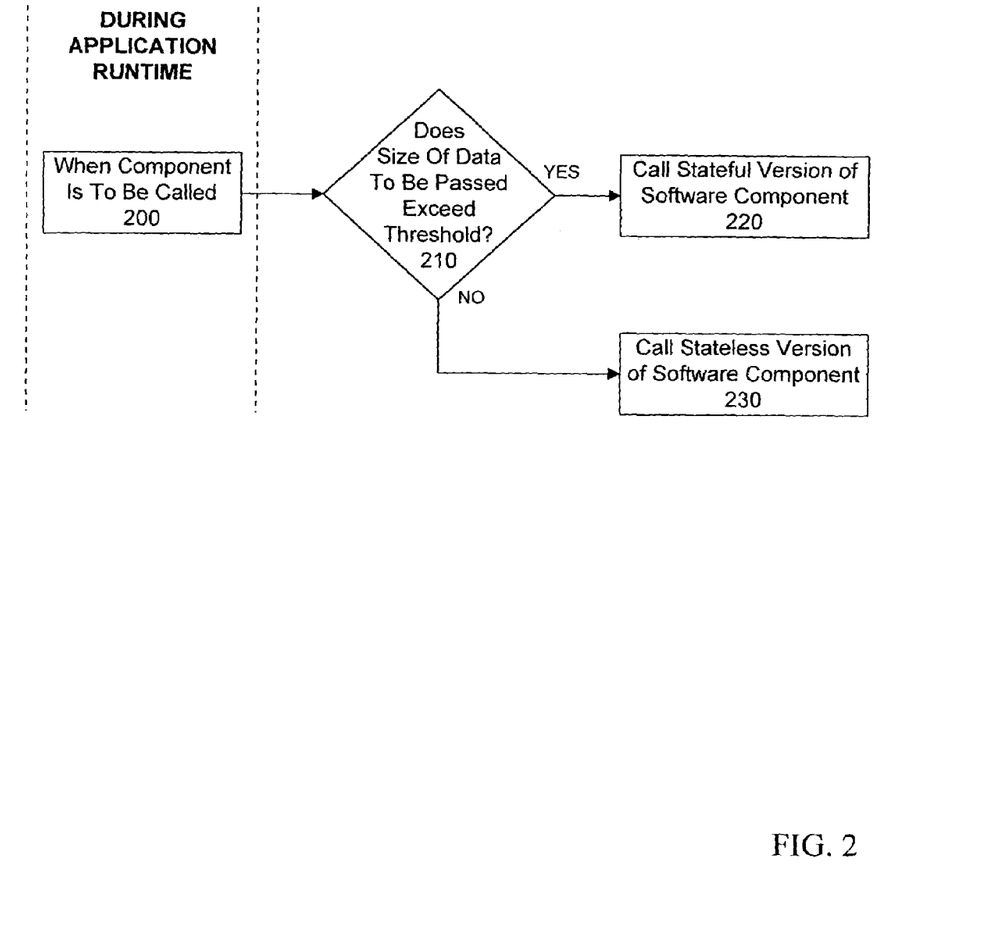
FIG. 2 is a block diagram that depicts a process for dynamically selecting stateful or stateless software components based on size of data to be passed in accordance with an embodiment of the present invention.

For example, the characteristic could include the size of data that would need to be passed from the calling application to the software component, as shown in FIG. 2. During application runtime, when a component is to be called to implement a particular process (step 200), the calling application determines if the size of data to be passed to the component for processing exceeds a certain predefined threshold (step 210). If so, a stateful version of the component is called (step 220); otherwise, a stateless version of the component is called (step 230).

Figure 3:
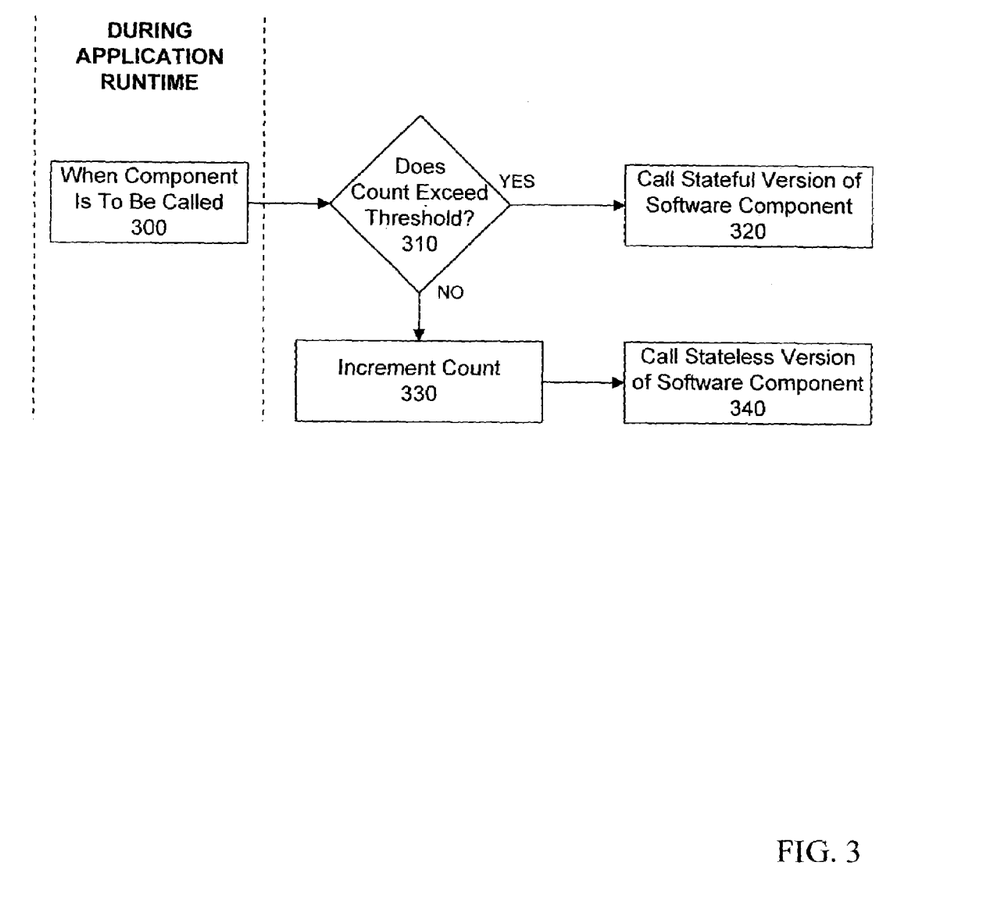
FIG. 3 is a block diagram that depicts a process for dynamically selecting stateful or stateless software components based on number of calls to be made to the component in accordance with an embodiment of the present invention.

In another example, the characteristic could include a complexity associated with the process to be implemented by the component, such as the number of calls to be made to the component, as shown in FIG. 3. During application runtime, when a component is to be called to implement a particular process (step 300), the calling application determines how many time a component has been called via a counter. If the number of previous calls to the component exceeds a certain predefined threshold (step 310), then a stateful version of the component is called (step 320); otherwise, a counter is incremented (step 330) and a stateless version of the component is called (step 340).

Architecture

Figure 4:
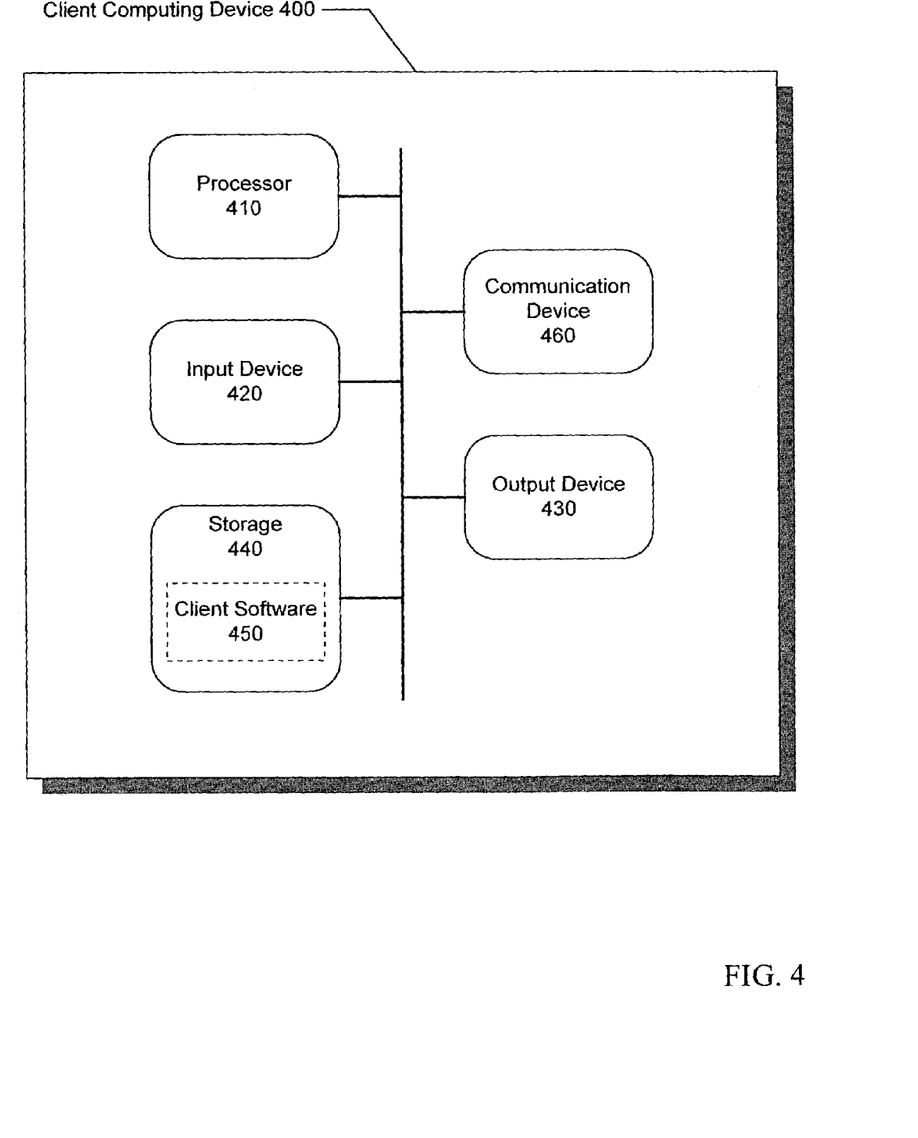
FIG. 4 is a block diagram that depicts a user computing device in accordance with an embodiment of the present invention.

FIG. 4 is a block diagram depicting the internal structure of client computing device 400 in accordance with an embodiment of the present invention. Client computing device 400 may be a personal computer, handheld personal digital assistant ("PDA"), or any other type of microprocessor-based device. Client computing device 400 may include one or more of processor 410, input device 420, output device 430, storage 440, and communication device 460.

Input device 420 may include a keyboard, mouse, pen-operated touch screen, voice-recognition device, or any other device that provides input from a user. Output device 430 may include a monitor, printer, disk drive, speakers, or any other device that provides output to user.

Storage 440 may include volatile and nonvolatile data storage, including one or more electrical, magnetic or optical memories such as a RAM, cache, hard drive, CD-ROM drive, tape drive or removable storage disk. Communication device 460 may include a modem, network interface card, or any other device capable of transmitting and receiving signals over a network.

Client software 450, which may be stored in storage 440 and executed by processor 410, may include a GUI to a client/server application, such as a CRM Internet Marketing application that embodies the functionality of the present invention.

The components of client computing device 400 may be connected via an electrical bus or wirelessly.

Figure 5:
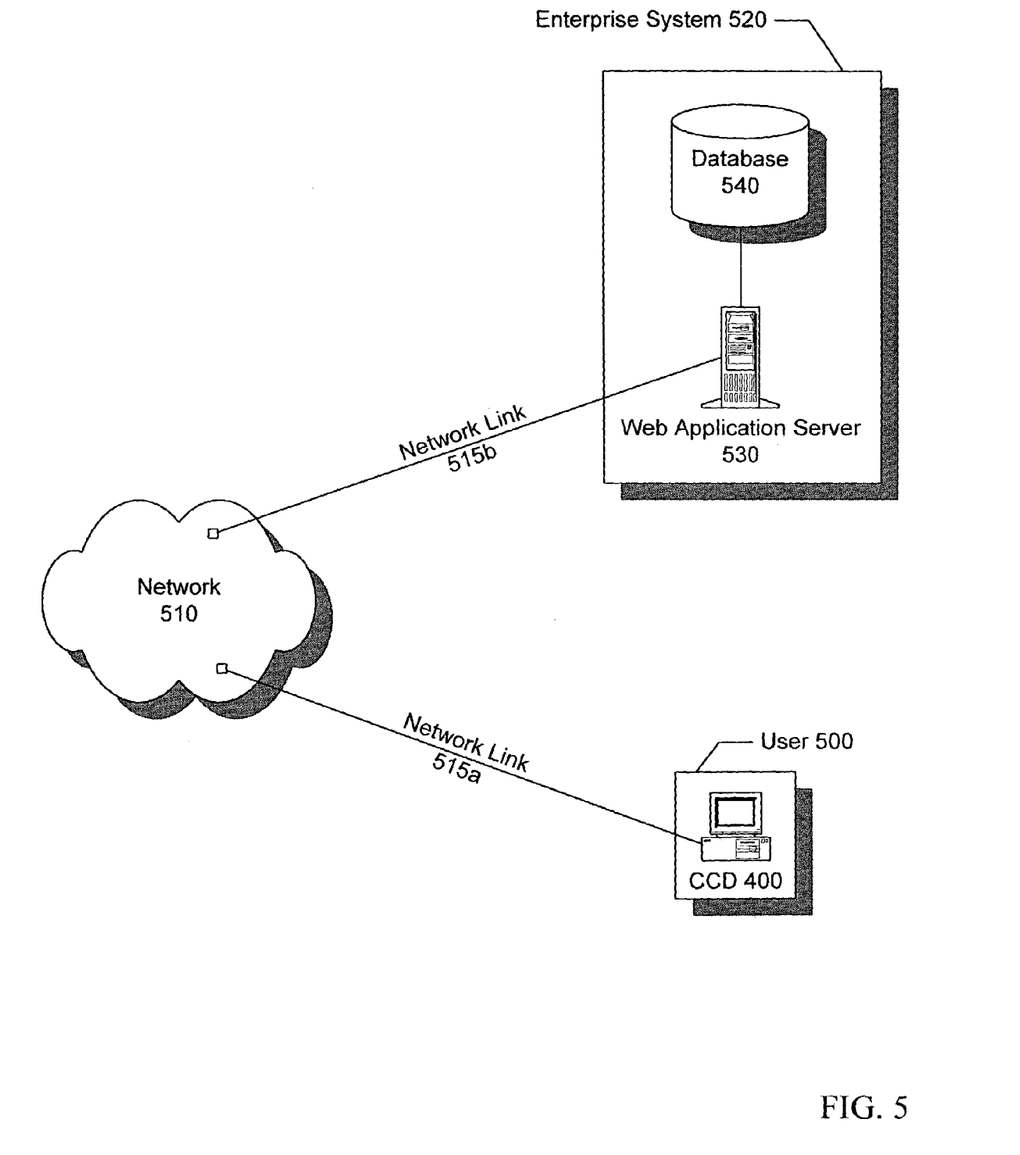
FIG. 5 is a block diagram that depicts a network architecture for an enterprise system in accordance with an embodiment of the present invention.

FIG. 5 is a block diagram depicting a network architecture for an enterprise system in accordance with an embodiment of the present invention. According to one particular embodiment, when user 500 invokes the CRM application GUI that is part of enterprise system 520, client computing device 400 sends and receives via client software 450 requests to and from web application server 530 via network link 515a, network 510, and network link 515b.

Network link 515 may include telephone lines, DSL, cable networks, T1 or T3 lines, wireless network connections, or any other arrangement that provides a medium for the transmission and reception of network signals. Network 510 may include any type of interconnected communication system, which may be based on packets, cells or circuits.

Network 510 may implement any number of communications protocols, including TCP/IP (Transmission Control Protocol/Internet Protocol). The communication between CCD 400 and web application server 530 may be secured by any security protocol, such as SSL (Secured Sockets Layer).

Web application server 530 includes a processor and memory for executing program instructions, as well as a network interface, and may include a collection of servers working in tandem to distribute the network functionality and load. In one particular embodiment, web application server 530 may include a combination of enterprise servers such as a web application server, a web user interface server and a database server, all of which could be manufactured by Sun Microsystems, Inc. Web application server 530 could run an HTTP server program in one embodiment, such as Apache®, as a process under an operating system such as UNIX® (or any variant thereof). Database 540 may be part of a relational database program, such as MySQL® that may be run as a process by a database server within the UNIX® operating system, for example.

Figure 6:
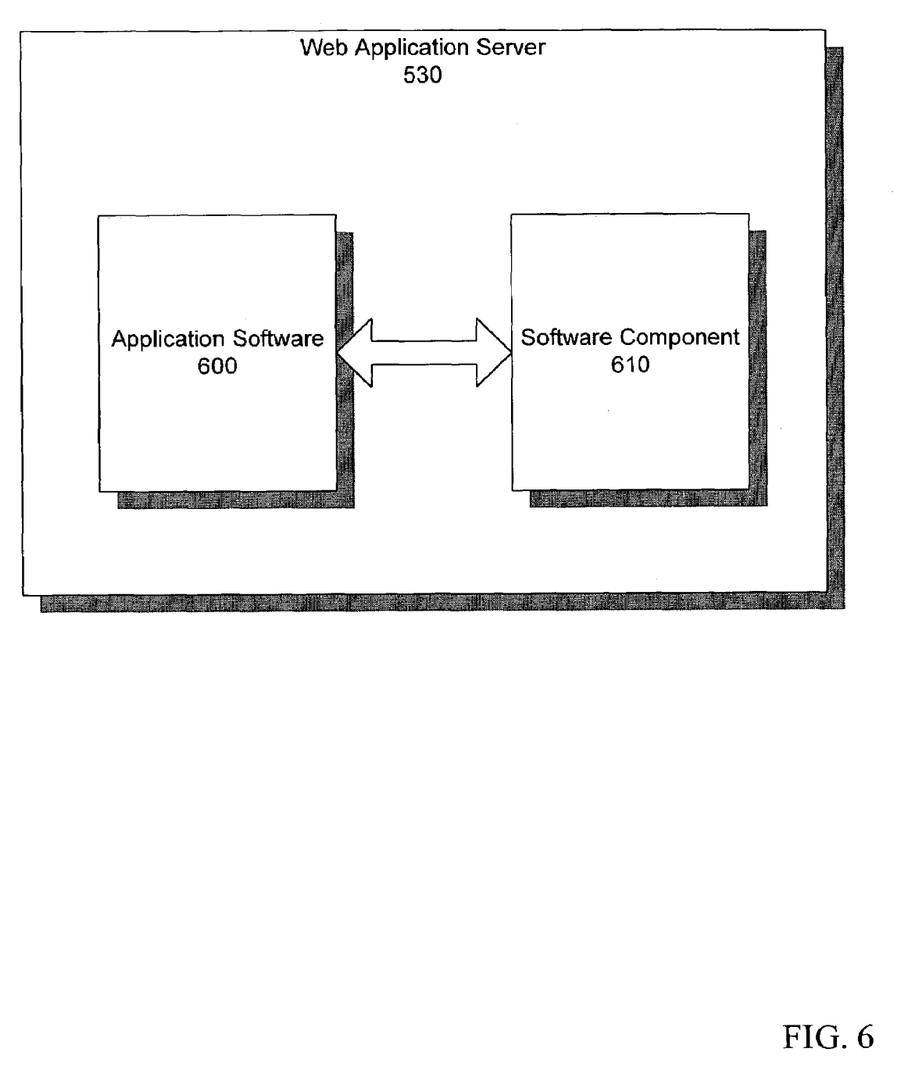
FIG. 6 is a block diagram that depicts a server architecture for an enterprise system in accordance with an embodiment of the present invention.

As shown in FIG. 6, application software 600 and software component 610 may take the form of custom-written programs and libraries that run, either interpreted or compiled, in part as a result of HTTP requests received by web application server 530. These programs may be written in any programming language, such as ABAP, C, C++ or Java. Application software 600 and software component 610 may be built on a web-based enterprise application platform, such as SAP Web Application Server 6.2, and may include a CRM Internet Marketing application embodying the functionality of the present invention.

The double-sided arrow in FIG. 6 represents, as stated above, that software component 610 refers to a reusable callable piece of software that is not native to application software 600. In one embodiment, web application server 530 could include both an SAP R/3 engine that hosts application software 600 which could be written in ABAP, and a J2EE engine that hosts software component 610 which could be an Enterprise JavaBean (EJB) written in Java.

EXAMPLE EMBODIMENT

FIGS. 7-11 illustrate an embodiment of the present invention in the context of marketing-related business software. In order to appreciate this embodiment of the present invention, a general understanding of the application software's underlying application framework is in order.

Application Framework

The application framework according to this embodiment (hereinafter "business text framework" or "BTF") provides an infrastructure for entering and processing texts in a standard format, such as HTML. A text refers to any type of document that can be represented by ASCII text such as HTML, XML, etc., and usually contains fields that are supplied with or replaced by values. In one embodiment, BTF provides an HTML editor so that a user can create and/or revise a text, along with service functions that allow a user to process the text. Application software may invoke the service functions of the BTF via method calls to a BTF document interface associated with each text. These service functions may be implemented by the BTF through the use of component software.

Figure 7:
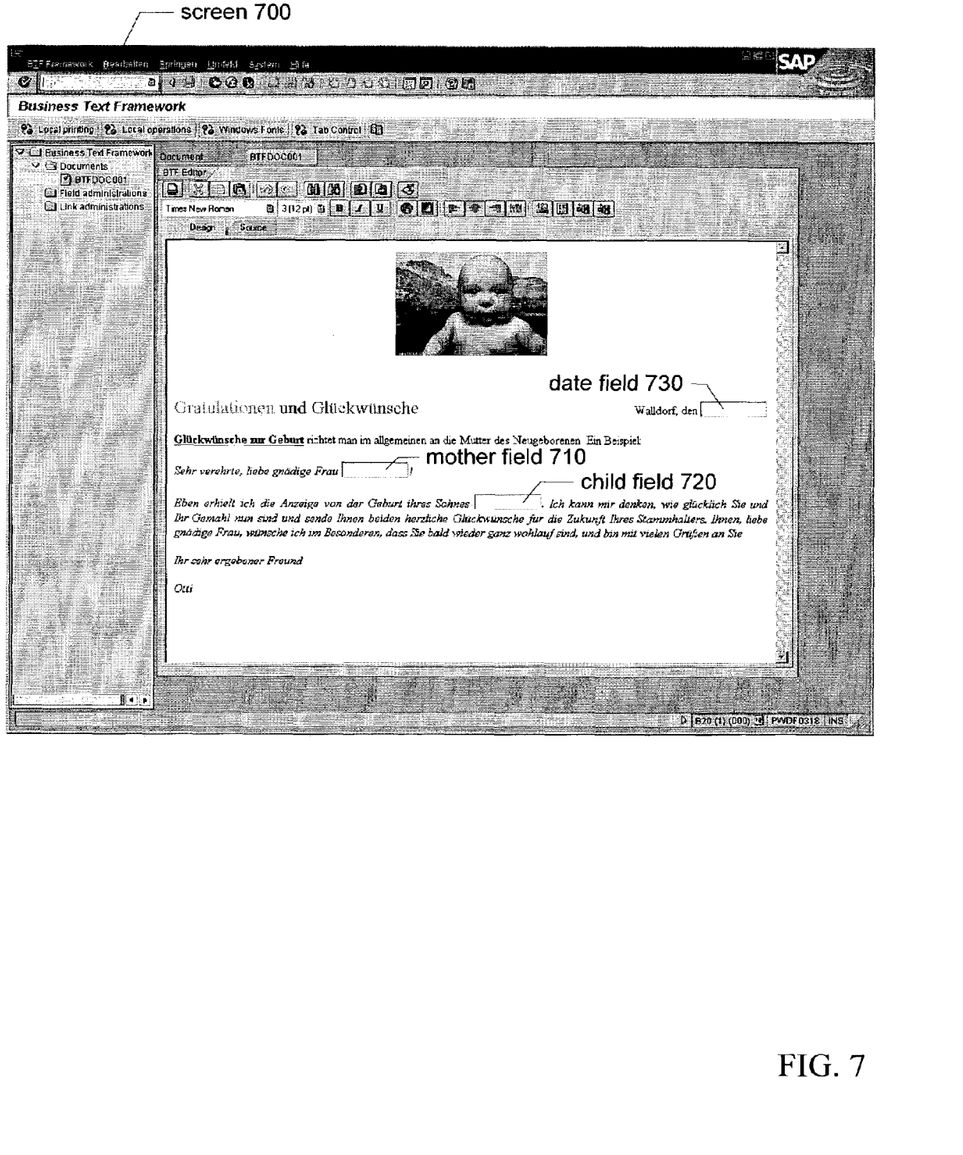
FIG. 7 is a screen shot that depicts a business process framework in accordance with an embodiment of the present invention.

For example, FIG. 7 illustrates an application utilizing the BTF HTML editor (or "BTF editor") in the main window of the screen. In this particular case, application software employs the BTF editor to allow a user to customize a baby announcement to be e-mailed to a list of people. So that this particular text may be used for anyone's baby announcement, it includes three customizable fields: mother field 710 to allow a user to input the name of the mother of the newborn, child field 720 for the name of the newborn and date field 730 for the date of the birth. Internally, the announcement text may be represented as an HTML document, in which the fields are implemented through the HTML INPUT element. In order for the BTF to recognize the relevant fields for processing, the id attribute of the relevant fields may include an arbitrary prefix, such as "%SAP_", for example.

Figure 8:
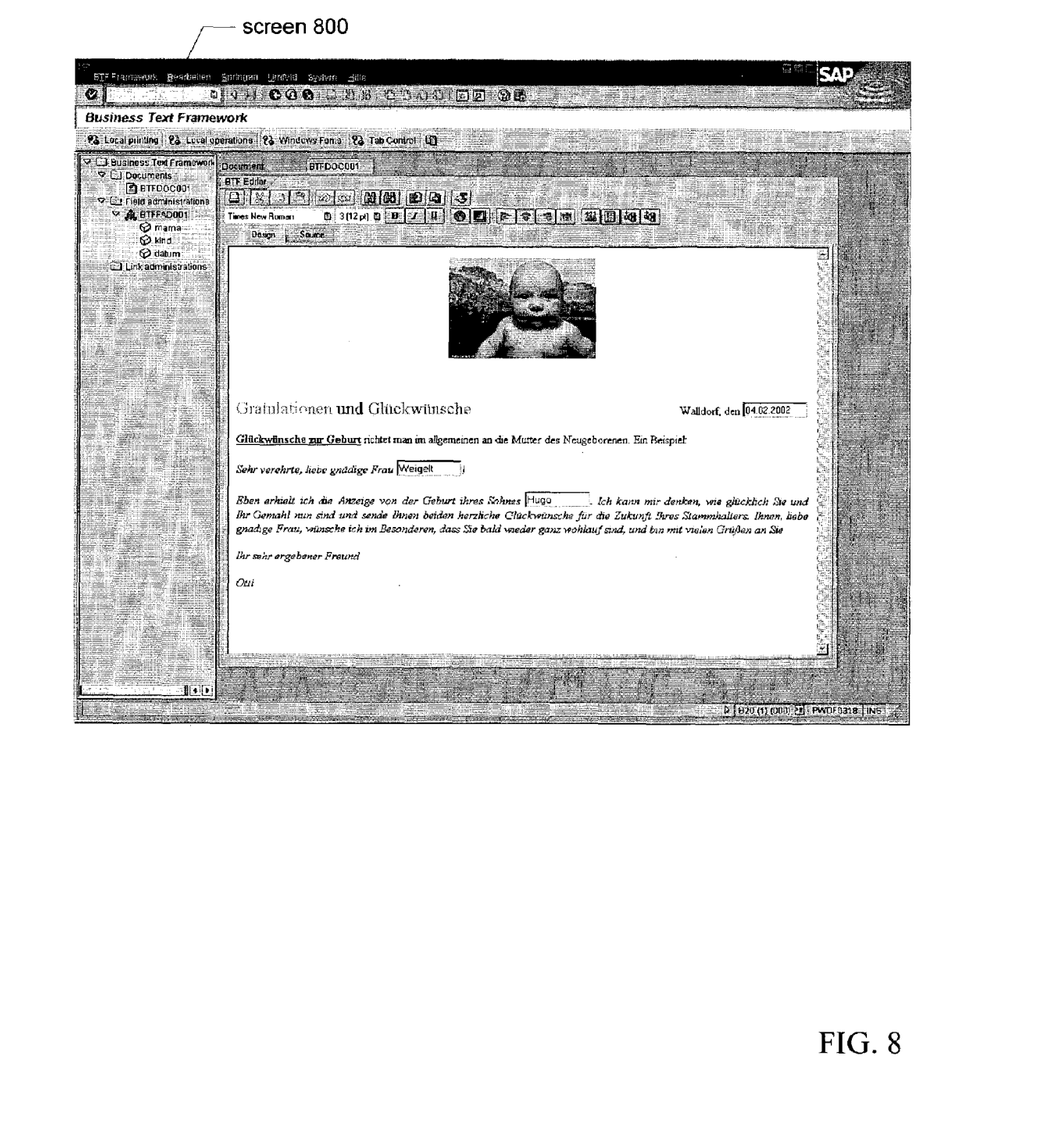
FIG. 8 is a screen shot that depicts a business process framework in accordance with an embodiment of the present invention.
Figure 9:
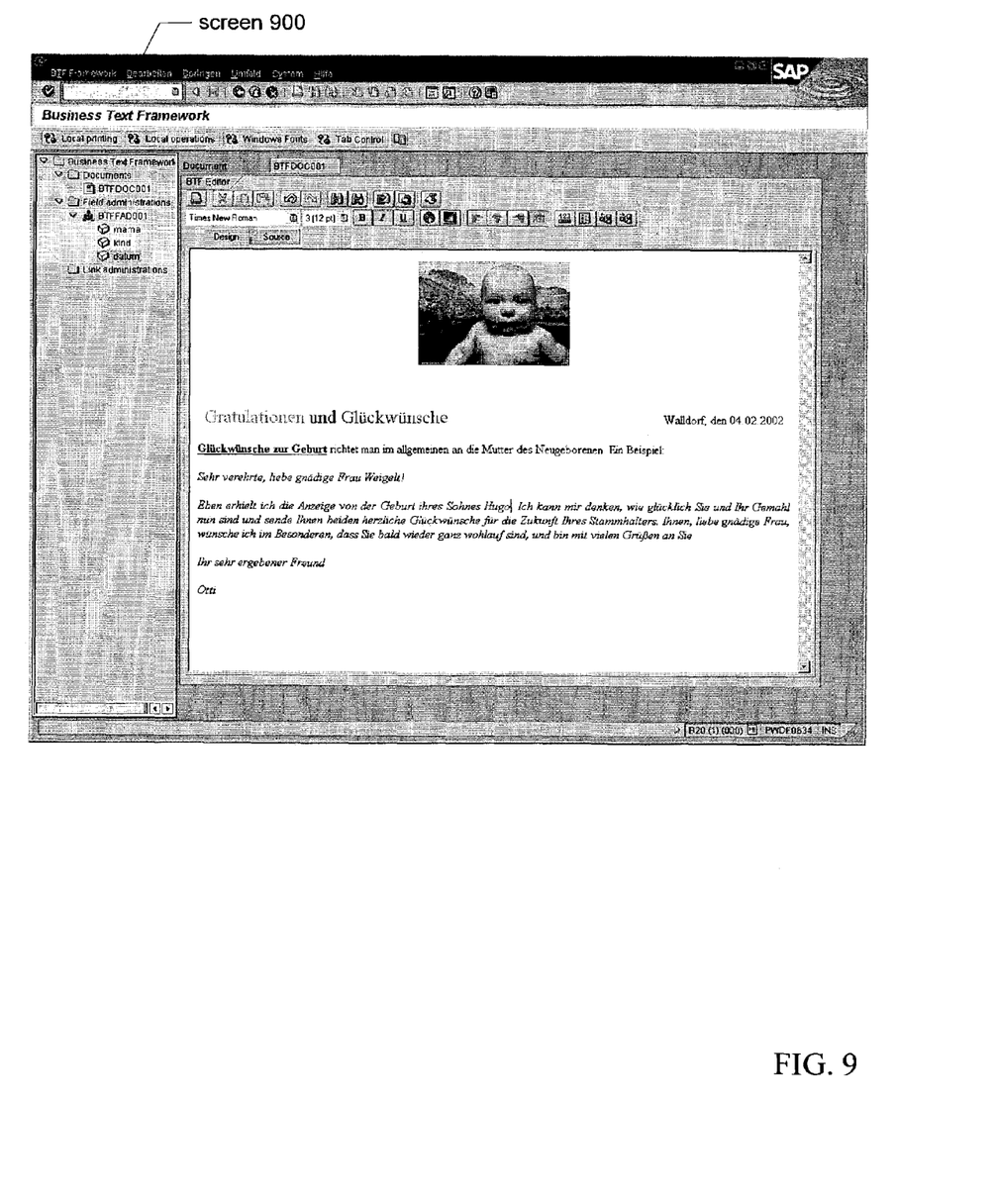
FIG. 9 is a screen shot that depicts a business process framework in accordance with an embodiment of the present invention.

In this scenario, the user's objective is to type in the relevant names and dates into the appropriate fields (as shown in FIG. 8), and to have the software incorporate the entered information into the text itself (as shown in FIG. 9) so that it may be e-mailed to a list of people. This process requires the BTF service functions for setting the content of the text, collecting the fields of the text and replacing the fields of the text; the latter two functions are implemented through method calls to component software.

The application first calls the set content method of the BTF so that the text can be loaded into the BTF for processing. This has been completed in screen 700, since the left navigation pane of the screen shows an internal text "BTFDOC001" listed under the "Documents" subfolder of the "Business Text Framework" folder.

Next, the application calls the collect fields method of the BTF so that data structures representing each field can be created in the BTF for further processing. This has been completed in screen 800, since the left navigation pane shows an internal field administration (i.e., data structure representing a collection of fields) for this text including mother field 710 ("mama" node), child field 720 ("kind" node) and date field 730 ("datum" node).

Finally, after the user has completed filling in the appropriate fields, the application calls the replace fields method of the BTF to convert the field data into the actual text. The resulting text is displayed through the BTF editor in screen 900 (note that the three field values have been integrated into the text itself). The customized text is now ready to be e-mailed to the appropriate people.

Stateless/Stateful Component Implementation

Figure 10:
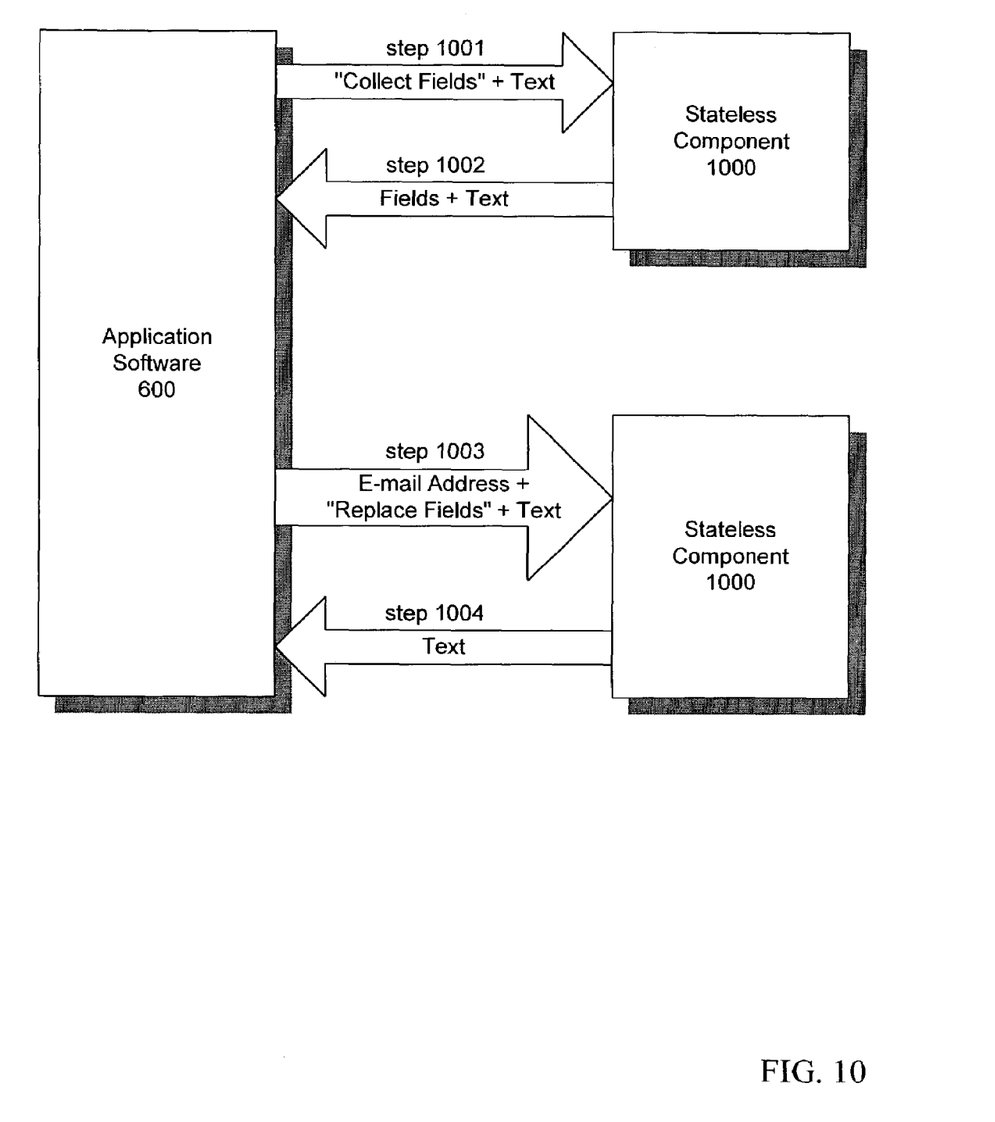
FIG. 10 is a sequence diagram that depicts the resulting message flow after a dynamic selection of a stateless software component in accordance with an embodiment of the present invention.
Figure 11:
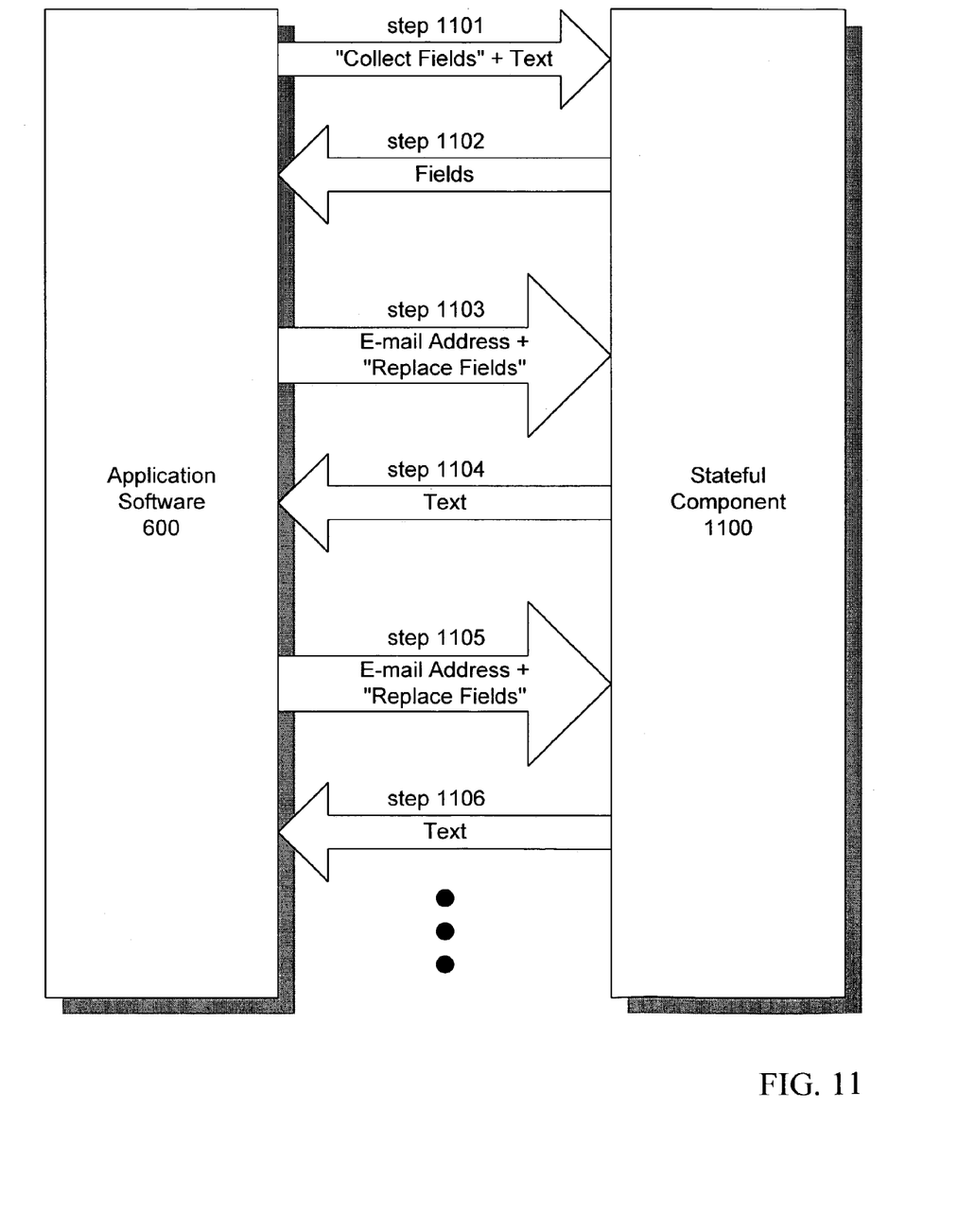
FIG. 11 is a sequence diagram that depicts the resulting message flow after a dynamic selection of a stateful software component in accordance with an embodiment of the present invention.

FIGS. 10 and 11 illustrate situations in which application software 600 may make different dynamic determinations as to the type of component to call based upon number of calls to be made to the component and size of text to be passed to the component.

The sequence diagram of FIG. 10 illustrates a situation similar to the baby announcement embodiment above, in which application 600 calls the collect fields method (step 1001) of component 1000 once, enables a user to fill in a field of the text (in this case an e-mail address), and then calls the replace fields method (step 1003) of component 1000 once. It can be presumed that the e-mail address is to be used for e-mailing the text to a person at that address.

In step 1001, application software 600 passes the text to stateless component 1000, which returns in step 1002 a field administration with the text. In step 1003 application software 600 passes the entered e-mail address and the text to stateless component 1000, which returns the integrated text in step 1004. Note that the passing of the text was not necessary in step 1002, but was necessary in step 1003 since component 1000 terminated itself and released any held data after step 1002 (i.e., stateless component 1000 is not able to retain the text from the step 1001 call for the subsequent step 1003 call).

Since application software 600 may determine at runtime that this particular process would only require two method calls (or a minimal threshold of calls) to component 1000, it can decide to call a stateless version of the component, since the overhead associated with maintaining a stateful component is not justified when such a minimal amount of calls are made. However, the situation is different in FIG. 11.

FIG. 11 illustrates a situation in which application software 600 has to e-mail the text to 10,000 people, and thus needs to call the replace fields method for each of 10,000 stored e-mail addresses. By determining the amount of calls to be made at runtime, application software 600 can dynamically decide to invoke stateful component 1100 instead of stateless component 1000, since the text would not have to be passed to stateful component 1100 every time the replace fields method is called (steps 1103, 1105, etc.). This is due to the fact that once the text is passed to stateful component 1100 in step 1101, it is retained to be used for the subsequent replace fields calls. The resulting savings of network traffic and execution time associated with not having to pass the text 10,000 time justifies the overhead associated with maintaining stateful component 1100.

Note that the determinations on which type of component to utilize in FIGS. 10 and 11 could have gone the other way. In FIG. 10, if the size of the text were extremely large, application software 600 may have decided that utilizing stateful component 1100 would be more efficient since the text would not have to be passed in step 1003. Conversely, if the size of the text in FIG. 11 were quite small, then application software 600 may have decided to implement stateless component 1000 to process the replace fields functionality, since the additional passages of the text would not significantly increase network bandwidth or execution time. The functionality of the stateless and stateful versions of the software component are the same; only the parameter data that is passed to each version varies.

The ABAP coding listed below is an example for the situation in which application software 600 bases its dynamic decision on whether to call a stateful or stateless software component solely on the size of the text. One possible implementation would be to set a flag in the BTF's set content method to represent whether the size of a text has exceeded a threshold amount.

```
method IF_BTF_DOCUMENT~SET_CONTENT.
data: l_len type i.
    me->text = text.
    me->encoding = encoding.
    i = xstrlen( text ).
    if i > c_limit.
        me->big = true.
    else.
        me->big = false.
    endif.
endmethod.
```

From this code one case see (in bold) that if the size of the text, which is determined by the function "xstrlen(text)", exceeds a threshold amount pre-defined in the variable "c_limit", then a flag representing that the text is "big" is raised, meaning that a stateful version of the software component should be subsequently invoked to process this text. Note that this determination could not be made prior to runtime, since the BTF has no prior knowledge of the size of a text that an application will provide to it for processing.

When the application would subsequently call the replace fields method of the BTF, the method would reference the flag to determine which version of the stateless or stateful software component to call, as illustrated in the following ABAP coding:

```
method IF_BTF_DOCUMENT~REPLACE_FIELDS.
...
if me->big = true.
call method me->doc_ref->replace_fields
    exporting
        fields             = field_table_serialized
        behaviour          = replace_behaviour
        cfg_standard       = l_cfg_standard.
else.
    call function 'BTF_REPLACE_FIELDS' destination
cl_btf=>destination
    exporting
        text_in            = text
        encoding           = encoding
        fields             = field_table_serialized
        behaviour          = replace_behaviour
        cfg_standard       = l_cfg_standard
    importing
        text_out           = text
    exceptions
        communication_failure = 1 message msg_text_in
        system_failure        = 2 message msg_text_in
        io                    = 3
        field_name            = 4
        field_value           = 5
        field_descr           = 6
        j2ee_parse            = 7.
endif.
...
endmethod.
```

From this code one can see that if the text is flagged as "big", then a replace fields method is called that does not export the text (since the text is already retained by the stateful component due to a prior collect fields method call). In this specific implementation, the BTF calls an ABAP proxy class (in bold) which holds the reference for the stateful software component; the proxy class in turn calls the corresponding replace fields method implemented by the stateful component. If the text is not "big", then a replace fields function is called that will result in the invocation of a stateless component to replace the fields, and the text is exported to the component for this purpose (in bold).

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A method for implementing a functionality using component software, comprising:
    determining at runtime whether to invoke a stateful or stateless software component for implementing the functionality, wherein the stateful and the stateless software component implement the same functionality, and wherein determining is based at least on a size of a document to be processed and on a complexity associated with the functionality, wherein the software component is invoked with parameters and wherein the document is a parameter;
    if the stateless software component is chosen, then invoking the stateless software component with the parameters, resulting in the functionality; and
    if the stateful software component is chosen, then invoking the stateful software component with the parameters, resulting in the functionality, and resulting in the stateful software component maintaining a state based on the parameters such that fewer parameters are needed to invoke the stateful software component subsequent times.

2. The method of claim 1, wherein the complexity includes a number of times that a document will be passed to or from the invoked software component.

3. The method of claim 1, wherein the complexity includes a number of method calls to the invoked software component needed to implement the process.

4. The method of claim 1, comprising invoking the stateless software component if a size of a document to be processed falls within a threshold amount.

5. The method of claim 1, comprising invoking the stateful component if a size of a document to be processed falls outside a threshold amount.

6. The method of claim 1, comprising invoking the stateless software if a complexity associated with the process falls within a threshold amount.

7. The method of claim 1, comprising invoking the stateful component if a complexity associated with the process falls outside a threshold amount.

8. The method of claim 7, wherein the stateless software component and the stateful software component are invoked across a communications network.

9. The method of claim 1, wherein the stateless component and the stateful component are invoked across a communications network.

10. The method of claim 1, wherein the stateless component and the stateful component are invoked to execute on a web application server from a client computer.

11. An electronic document processing method, comprising:
    setting content of the electronic document via a document interface, the document interface declaring attributes and service functions for the document;
    calling a service function via the document interface to invoke a software component to process the document, wherein stateless and stateful versions of the software component are available to process the document and the service function determines which version of the software component to invoke based at least on a size of the document and on a complexity of processing the document, wherein the document is a parameter, and wherein stateless and the stateful versions implement the same functionality.

12. The electronic document processing method of claim 11, wherein the setting of the content comprises:
evaluating a quality of the document content, and
setting an attribute for the document based on the evaluation;
and wherein the calling of the service function comprises:
determining which version of the software component to instantiate based on the set attribute for the document.

13. The electronic document processing method of claim 12, wherein the quality includes a size of the document content.

14. The electronic document processing method of claim 12, wherein the quality includes a processing complexity of the document content.

15. The electronic document processing method of claim 11, wherein the software component replaces fields in the document with corresponding values and returns the processed document.

16. An apparatus for processing a document, comprising:
a processor; and
a memory, coupled to the processor, storing instructions adapted to be executed by the processor to:
load content of the document into a document object,
set a flag in the document object based on overhead associated with processing of the document, wherein the flag is set at least based on a size of the document and on a complexity associated with the processing of the document, wherein the document is a parameter, and
call a software component to process the document using the flag to determine which one of an available stateless and stateful version of the software component to call, wherein the stateless software component and the stateful software component implement the same functionality.

* * * * *